United States Patent [19]

Coody

[11] Patent Number: 5,065,541

[45] Date of Patent: * Nov. 19, 1991

[54] ARTIFICAL FISHING LURES

[75] Inventor: Archibald S. Coody, Hemphill, Tex.

[73] Assignee: Fred Arbogast Company, Inc., Akron, Ohio

[*] Notice: The portion of the term of this patent subsequent to Apr. 16, 2008 has been disclaimed.

[21] Appl. No.: 586,577

[22] Filed: Sep. 21, 1990

Related U.S. Application Data

[63] Continuation-in-part of Ser. No. 470,850, Jan. 26, 1990, Pat. No. 5,007,194.

[51] Int. Cl.$^5$ ............................................. A01K 85/00
[52] U.S. Cl. ................................. 43/42.29; 43/42.24; 43/42.25; 43/44.2
[58] Field of Search ................... 43/44.2, 42.29, 42.28, 43/42.3, 42.26, 42.24, 42.32

[56] References Cited

U.S. PATENT DOCUMENTS

| | | | |
|---|---|---|---|
| 567,310 | 9/1896 | Gaide | 43/42.32 |
| 2,825,173 | 3/1958 | Gederos | 43/44.2 |
| 3,964,203 | 6/1976 | Williams, Jr. | 43/42.29 X |
| 4,158,927 | 6/1979 | Capra et al. | 43/4.5 |
| 4,712,325 | 12/1987 | Smith | 43/42.24 |
| 4,771,568 | 9/1988 | Head | 43/42.29 |
| 4,791,750 | 12/1988 | Gammill | 43/42.31 |
| 4,920,688 | 5/1990 | Devereau et al. | 43/42.28 X |

Primary Examiner—Richard K. Seidel
Assistant Examiner—Patty E. Hong
Attorney, Agent, or Firm—Renner, Kenner, Greive, Bobak, Taylor & Weber

[57] ABSTRACT

An improved fishing lure (10, 110) embodying the concepts of the present invention is adaptable for use with a fish hook (11, 26, 30, or 111). The lure (10, 110) comprises a body (12, 112) having a forward, head portion (13, 113) and at least one trailing appendage portion (14, 114). The body (12, 112) exhibits supple flexibility, at least when immersed in water, and a plurality of relatively long fibers (15, 115) extend outwardly from at least one surface (16, 116) on the head portion (13, 113). To facilitate use of the lure (10 or 110) the head portion (13, 113) is adapted to be penetrated by the point (18, 28, 118 or 31 and 32) of a fish hook (11, 111, 26 or 30). In one embodiment the head portion (113) is also adapted to be interconnected with the shank (130) of the hook (111). The body (12, 112) is preferably planar with at least one surface (16, 116), and the relatively long fibers (15, 115) extend outwardly from that surface (16, 116). Ideally, the body (12, 112) is natural sheepskin, and the relatively long fibers (15, 115) are the natural wool fibers presented from the sheepskin. Moreover, the body (12, 112) may be chemically treated in order to assure that the sheepskin will exhibit supple flexibility, even upon re-immersion in water after having been dried.

2 Claims, 2 Drawing Sheets

ARTIFICAL FISHING LURES

CROSS-REFERENCE TO RELATED APPLICATION

This application is a continuation-in-part of U.S. patent application Ser. No. 470,850, filed Jan. 26, 1990 and issued a U.S. Pat. No. 5,007,194 on Apr. 16, 1991.

TECHNICAL FIELD

The present invention relates generally to artificial fishing lures. More particularly, the present invention relates to an artificial fishing lure having a body with a head portion and at least one trailing appendage portion, all portions of which exhibit supple flexibility. Specifically, the present invention relates to a fishing lure made of sheepskin that is processed to possess supple flexibility and having wool fibers extending outwardly from selected portions thereof.

BACKGROUND OF THE INVENTION

Over the past several decades the number of fishing lure configurations available on the market has only been exceeded by the number of persons having an interest, and taking active part, in the sport of fishing.

Fishing lure configurations may be categorized according to the manner in which they are to be fished—i.e.: they may be cast and retrieved (either along the surface of the water or beneath the surface of the water); they may be jigged, trolled, floated or remain suspended at a predetermined depth.

To expand upon the foregoing summarization, a lure may be designed to be cast, allowing its weight to draw out the line as the momentum of the lure carries it the desired distance. The lure may then be retrieved on the surface of the water. Such a lure may incorporate means to generate noise in an effort to attract game fish. On the other hand, such a lure may be configured to be retrieved beneath the surface of the water, and it may still incorporate means to generate noise. It should be appreciated that the configuration itself may serve not only to generate a desired sound but also to impart a specific movement, or action, to the lure as it moves through, or on, the water in order to attract game fish.

Other configurations permit the lure to be jigged; that is, the lure attracts game fish as it is pulled toward the surface and then allowed to drop to a greater or lesser depth. When fished in this way, the shape of the lure may cause it to wiggle, or flutter, in a manner deemed attractive to game fish. Generally, a casting type lure intended to be retrieved on the surface of the water cannot be used effectively as a jigging lure or vice versa. Nevertheless, any, or all, of the foregoing lure configurations may be enhanced by coloration.

Fishing lure configurations may also be categorized according to the type of equipment with which they will be used. For example, users of bait-casting, spin-casting or purely spinning type equipment will generally employ lures of a sufficient weight to facilitate withdrawal of the line during the cast. These same lures would not be appropriate to a person using fly-rod equipment. The fly-fisherman will choose "flies," or light weight lures, specifically designed for that type of fishing. Such lures are much lighter inasmuch as their presentation is accomplished by the distribution of the weight of the line along its length and not by the weight of the lure.

From the foregoing discussion, it will be appreciated that not every lure will be all things to all fishermen. For that reason a particular lure may be extensively used and accepted by one group of fishermen but not be used or accepted by another group.

One particular style of lure, or lure accouterment, however, has gained wide acceptance and has been effectively used with virtually all styles of fishing. This lure style may be used alone or may be attached as a "trailer" to many of the different types of lures heretofore mentioned. This lure style produces an action that has been found to be particularly attractive to game fish. The original embodiment of this lure style was comprised of pork rind which had to be kept in a jar of preservative until ready for use and had to be returned to the fluid-filled jar almost immediately after it had been used. Otherwise, the pork rind would loose the supple flexibility that imparted the unique action for which the pork rind was noted. Once that supple flexibility was lost it could not be regained. Even with the obvious inconveniences inherent to the use of pork rind, the benefits derived by its usage are sufficient that fishermen endure the annoyances.

Pork rind may be secured to a bare hook, or it may be secured to the hook that is attached to a lure. In either situation the pork rind is allowed to trail behind the lure as it is retrieved, jigged, or even trolled behind a boat. Pork rind is also available in a wide variety of sizes, as well as in numerous shapes which resemble various aquatic life forms upon which game fish are known to feed. For example, some pork rind is configured in shapes to imitate a frog while others are configured to imitate crayfish, grubs, or even eels. While pork rind has been accepted, and successfully used, by various groups of fishermen for many years, pork rind suffers from the aforementioned disadvantage that it must be stored in a suitable fluid when not in use. This is required because pork rind, when dried, becomes stiff and hardens to such an extent that it is extremely difficult to remove from a barbed hook after it has hardened. Moreover, hardened pork rind will not return to its useful, pliable condition once it is allowed to dry, and in such condition it becomes useless and must be discarded.

To eliminate the inherent problems with pork rind manufacturers have simulated that material with various synthetic substitutes and/or leather which has been chemically treated so that it will retain, and/or regain, its original pliability and softness, even after it has dried. Exemplary of these pork rind substitutes are those offered by Berkley under the trademark Strike Rind and by The Fred Arbogast Company under the trademark Dri Rind. In fact, a pork rind substitute is described in U.S. Pat. No. 4,771,568 which is owned by The Fred Arbogast Company. The last mentioned pork rind substitute is comprised of a chemically treated sheepskin which may be easily formed into an appropriate shape not only to facilitate mounting the resulting pork rind substitute on the shank of a hook but also to present the desired configuration to the game fish. All of these prior known pork rind substitutes exhibit a relatively thin cross-section of material and may be cut into the many shapes and sizes preferred by fishermen.

SUMMARY OF THE INVENTION

It is, therefore, a primary object of the present invention to provide an improved fishing lure comprised of a material that will effectively absorb, and/or entrain, sufficient quantities of water so that the lure will possess approximately a neutral buoyancy, thus allowing the lure to sink relatively slowly.

It is another object of the present invention to provide an improved fishing lure, as above, which has a sufficient degree of pliability and supple flexibility to permit it to exhibit life-like action in order to attract game fish.

It is a further object of the present invention to provide an improved fishing lure, as above, which has a relatively bulky head portion from which a plurality of relatively long fibers extend to "encase" the point of a fishing hook and thereby provide a weedless type lure capable of being fished in heavy cover and yet allow the point of the hook to be effective when struck by a fish.

It is also an object of the present invention to provide an improved fishing lure, as above, wherein the head portion of the pliable material is attached to the shank of a fishing hook in proximity to the eye and wherein the point of the hook penetrates the body portion to be encased within the long fibers to make the combination weedless.

It is still another object of the present invention to provide an improved fishing lure, as above, having a head portion and at least one trailing appendage portion from which a plurality of relatively short fibers may extend.

It is yet another object of the present invention to provide an improved fishing lure, as above, which may be dyed in highly contrasting colors that may be contiguously juxtaposed in order to present an attractive target to various game fish.

It is a still further object of the present invention to provide an improved fishing lure, as above, having the capability of accepting larger quantities of fish attractants than were heretofore possible with prior known lures of this general type.

It is an even further object of the present invention to provide an improved fishing lure, as above, having a sufficient mass in the head portion to accept a sound chamber for attracting game fish without detracting from the original size and shape of the lure or without adversely affecting its life-like action in the water.

It is also an object of the present invention to provide an improved fishing lure, as above, which may be fished in numerous ways by all groups of fishermen, the lure being comprised of a natural material which is biodegradable in the environment.

These and other objects of the invention, as well as the advantages thereof over existing and prior art forms, which will be apparent in view of the following detailed specification, are accomplished by means hereinafter described and claimed.

In general, an improved fishing lure embodying the concepts of the present invention is adaptable for use with a fish hook and comprises a body having a forward head portion and at least one, trailing appendage portion. The body portion exhibits a supple flexibility, at least when immersed in water, and a plurality of relatively long fibers extend outwardly from the head portion. To facilitate use of the lure the head portion is adapted to be penetrated by the point of a fish hook. According to one approach the penetration of the lure by the point of the fish hook comprises the only connection between the lure and the hook. However, according to an alternative arrangement means are provided to effect a connection between the lure and the shank of the hook in proximity to the eye of the hook as well as by having the point of the hook penetrate the lure.

The body portion is preferably planar to present oppositely directed surfaces, and the relatively long fibers extend outwardly from only one of the oppositely directed surfaces. Ideally, the body is natural sheepskin, and the relatively long fibers are the natural wool fibers presented from the sheepskin. Moreover, the body is preferably chemically treated in order to assure that the sheepskin will exhibit supple flexibility upon immersion in water, even after it has dried.

Two exemplary fishing lures, and one minor variation thereof, are deemed sufficient to effect a full disclosure of the subject invention and are shown by way of example in the accompanying drawings. The first embodiment, and a variation thereof, depicts the entire lure as being a trailer such that the only connection between the lure and the hook results from the point of the hook penetrating the head portion of the lure. The second embodiment depicts the lure as being connected to the shank of the hook and with the point also penetrating the head portion. In both embodiments the configuration of the lure results in a weedless arrangement when the point of the hook properly penetrates the lure. Both embodiments, and the variation, are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
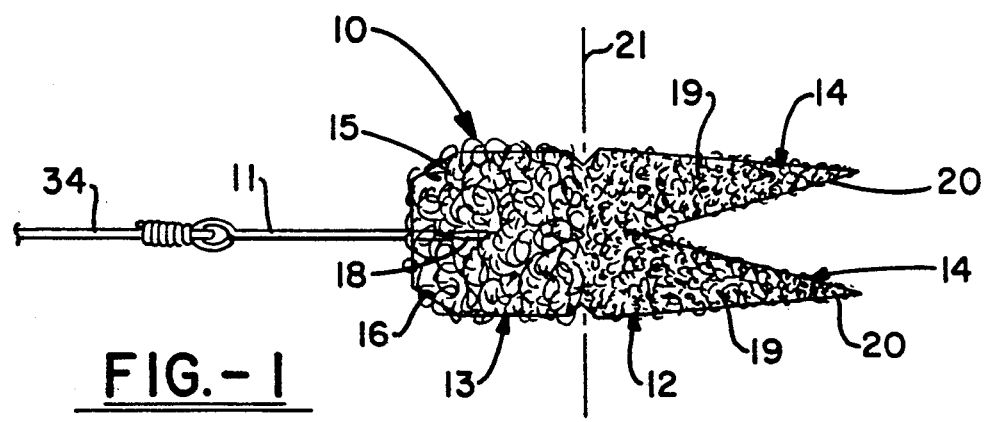
FIG. 1 is a top plan view of a fishing lure embodying the concepts of the present invention, said view depicting the lure as it may be used in conjunction with a simple, single point fish hook.
Figure 2:
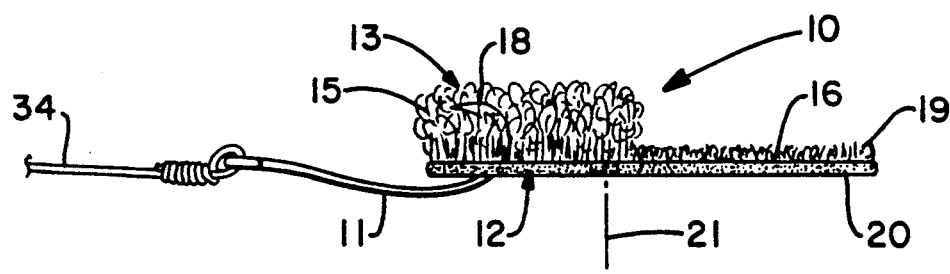
FIG. 2 is a side, elevational view of the lure and fish hook shown in FIG. 1.

One representative form of a fishing lure embodying the concepts of the present invention is designated generally by the numeral 10 on the accompanying drawings. With particular reference to FIGS. 1 and 2, the representative lure 10 is shown as it may be mounted on a single hook 11. The body 12 of the lure 10 includes a head portion 13 and at least one, trailing appendage portion 14. The body 12 is preferably comprised of a natural sheepskin with the relatively long fibers 15 of the wool on the sheepskin being left substantially intact to extend outwardly from that area of the surface 16 on the body 12 which is coextensive with the head portion 13. The point 18 of the single hook 11 penetrates the head portion 13 of the body 12 to be loosely encased within the mass of the relatively long wool fibers 15. Because the point 18 is thus hidden within the relatively long fibers 15, the lure 10 has the characteristics of a weedless lure, which is an advantage when fishing heavy aquatic cover such a growth of lily pads which might be found along the shorelines of many inland lakes, and yet the hook 11 will be fully effective when the lure 10 is struck by a fish.

Figure 7:
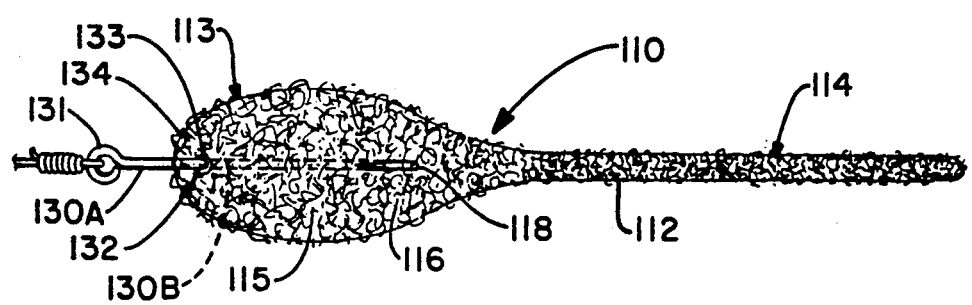
FIG. 7 is a plan view of an alternative arrangement for a fishing lure which also embodies the concepts of the present invention and which depicts the head portion of the lure interconnected to both the shank and the point of a fish hook with a long thin appendage trailing behind the hook; and, FIG. 8 is a side elevational view of the lure depicted in FIG. 7.
Figure 8:
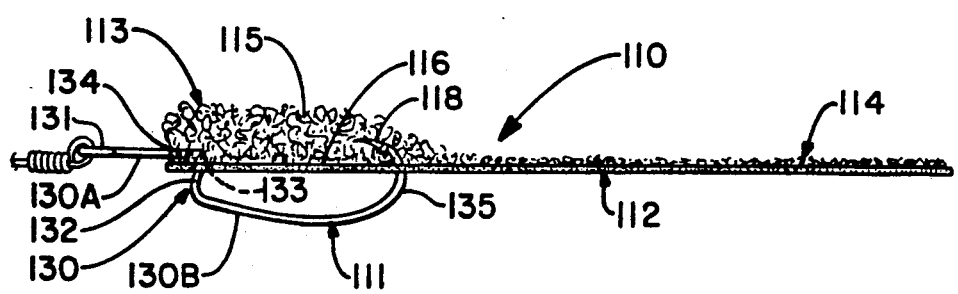

A second representative form of a fishing lure embodying the concepts of the present invention is designated generally by the numeral 110 on FIGS. 7 and 8. With particular reference to those figures, the lure 110 also has a body 112 which includes a head portion 113 from which a relatively long, narrow appendage 114 trails. Relatively long fibers 115 extend outward from at least surface 116 on the head portion 113 of the body 112.

In the alternative arrangement, however, the hook 111 may have a slightly different configuration to accommodate the interconnection between the lure 110 and the hook 111. Specifically, the shank 130 may be interrupted in proximity to the eye 131 by a lateral offset 132. By having the lateral offset 132 orthogonally disposed with respect to the portions 130A and 130B of the shank 130 connected thereby, the hook 111 has a convenient means by which to be interconnected to the lure 110.

It should be noted that the shank is commonly a single member that extends between the eye and the bend of a fishing hook. As such, when one generally refers to the shank it may be identified by the single numerical designation 130. However, in the alternative embodiment of the lure 110, the hook 111 incorporates a lateral offset 132 which separates the shank 130 into two portions. Accordingly, a common numerical designation shall be employed when referring to the two portions of that common element. However, when one portion of that common element is to be individually identified, it shall be referenced by virtue of a letter suffix employed in combination with the numerical designation employed for general identification of that element. Thus, because there are two portions of the shank, either may be generally identified by the numeral 130, but the specific, individual frame elements are, therefore, identified as 130A and 130B, both in the specification and on the drawings.

With particular reference to FIG. 7, an aperture 133 penetrates the lure 110 adjacent the leading edge 134 of the head portion 113. When attaching the lure 110 to a hook 111, the point 118, bend 135 and shank 130B are threaded through the aperture 133 to position the lateral offset 132 within the aperture 133. The hook 111 is then oriented to permit the point 118 to penetrate the head portion 113 of the body 112 so that it will be loosely encased within the relatively long fibers 115. In this embodiment, as well, because the point 118 is thus hidden within the relatively long fibers 115, the lure 110 has the characteristics of a weedless lure.

Before describing the several advantages achieved by the exemplary configurations of the lures 10 and 110 it should be noted that not just any animal skin can be employed. Rather, it must be a skin which, when processed, is capable of exhibiting supple flexibilty upon being immersed in water, even after it has dried following one or more previous immersions in water.

One commonly thinks of a chamois as being a skin which, when processed, exhibits this requisite characteristic for the subject lure. However, chamois skins are not readily, or economically, available for use as, or in conjunction with, fishing lures. Sheepskin has been found to possess the characteristically repetitive ability of the chamois to return to its state of supple flexibility upon immersion in water, even after it has dried. This result has heretofore been accomplished by treating the sheepskin with cod liver oil during the tanning process. Such treatment does afford the desired supple flexibility, but the use of cod liver oil prevents the sheepskin from accepting dies so that colors of the selected hue will have the intensity desired for use on a fishing lure. As such, the presence of the cod liver oil causes the color to lack intensity, and the resulting dull appearance of the color presented is not desirable to either the fish or the fisherman.

It has been found that sheepskin can be processed not only to exhibit the supple flexibility but also to provide the many additional characteristics, including the intensity of the selected coloration, desired for a lure embodying the concepts of the present invention. This result is achieved by the liberal usage of a surfactant during the tanning process. A typical surfactant which works quite well is an ethylene oxide which is commonly available under the trademark 9-MOL from Van Waters & Rogers.

The surfactant assists in de-greasing the skin during the initial pre-soak, and its liberal usage during the tanning procedure opens the pores of the skin and maintains them open so that upon the conclusion of the process, the sheepskin will dry to a rather stiff condition but will regain its supple flexibility immediately upon re-immersion in water. Moreover, the use of a surfactant does not decrease the intensity of the color provided by the die applied to the tanned sheepskin.

The sheepskin which comprises lures 10 and 110 has the additional advantage of preserving the wool fibers 15 and 19 in a naturally neutral color that may also be readily dyed to any of the colors commonly preferred by knowledgeable fishermen. The dying process may be employed to color the body 12 with, or without, coloring the fibers 15 or 19. Or, the fibers 15 or 19 may themselves be died, either alone or in conjunction with selected portions of the body 12. This ability to effect selective coloration to the lure also allows the use of highly contrasting colors which may be disposed in contiguous juxtaposition. It has been found, for example, that the movement of a lure having highly-contrasting colors which touch are more productive in attracting and catching game fish. Thus, the contiguous juxtapositioning of contrasting colors may provide a line of demarcation 21, such as represented along the juncture of the head and trailing appendage portions 13 and 14, respectively.

It should be appreciated that the natural sheepskin which comprises the body 12 of the lures 10 or 110 is not merely "leather" made from the animal inasmuch as the term leather implies that the wool fibers have been removed from the skin. Accordingly, the sheepskin which comprises the body 12 of either lure is the natural hide, including the wool fibers of the animal, and therein lies an important advantage of either lure 10 or 110 over other lures now available. The wool fibers 15 and 19 are capable of entraining air bubbles and also of adsorbing a film of water therealong so that lures embodying the concepts of the present invention will possess substantially neutral buoyancy. The absorption of water into the body portion 12 formed by the specially processed sheepskin also contributes to the desired end result of neutral buoyancy.

The wool fibers 19 which extend outwardly from that portion of the surface 16 on the body 12 which is coextensive with the trailing appendage portion 14 are preferably sheared so that they are relatively short.

The sheepskin from which the present lures are fabricated also exhibits another advantage in that the interstices between the relatively long fibers 15 are capable of accepting a relatively large amount of fish attractant. The attractant, of course, will diffuse into the surrounding water as the lure is moved, creating a potent "track" within the water which will guide fish to the lure.

In order to enhance the flexibility of the lure 10, and also to simulate the profile of an aquatic animal, such as a frog, the trailing appendage portion may be bifurcated to present a pair of legs 20.

The relatively long, narrow appendage 114 incorporated in the lure 110 simulates the profile of a worm. Worms have historically been excellent bait for catching fish, and artificial worms, fabricated primarily from plastic, have similarly become extremely popular. However, because of the fact that the plastic material from which artificial worms have heretofore been made is not biodegradable, sportsmen who are environmentally oriented have begun to avoid usage of such worms. In addition to being biodegradable, it can be appreciated that all the advantages heretofore described with reference to lure 10 apply equally well to lure 110.

Figure 3:
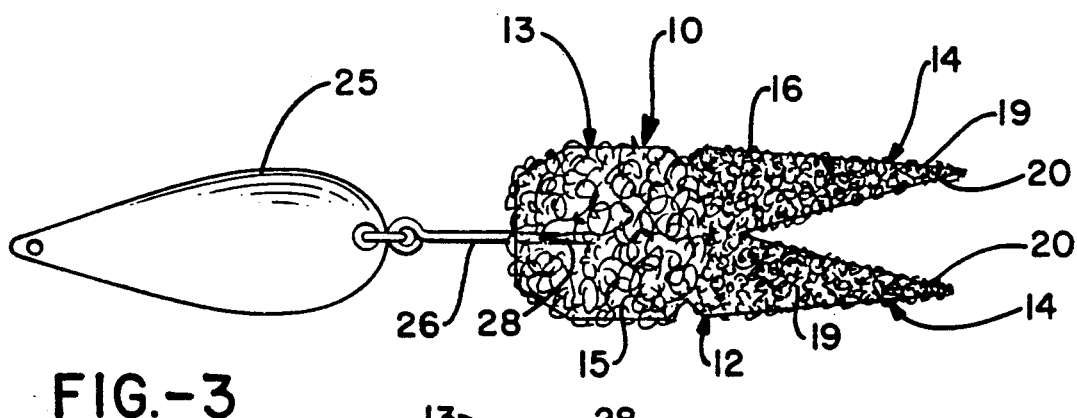
FIG. 3 is a top plan view of a fishing lure embodying the concepts of the present invention which depicts the lure as it may be used in association with a conventional, spoon-type fishing lure.
Figure 4:
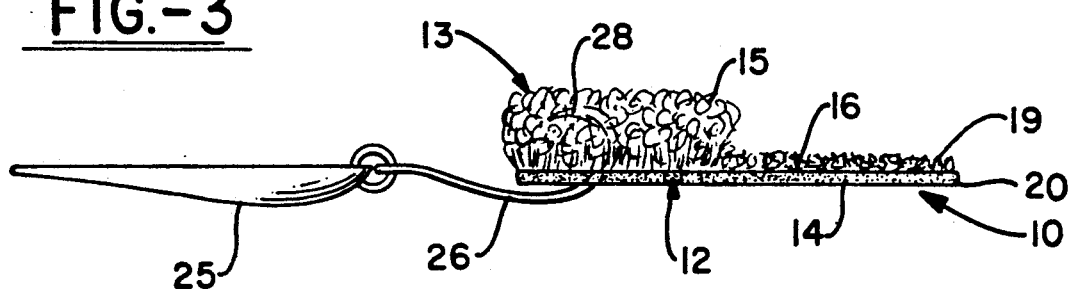
FIG. 4 is a side elevational view of the combination illustrated in FIG. 3.
Figure 5:
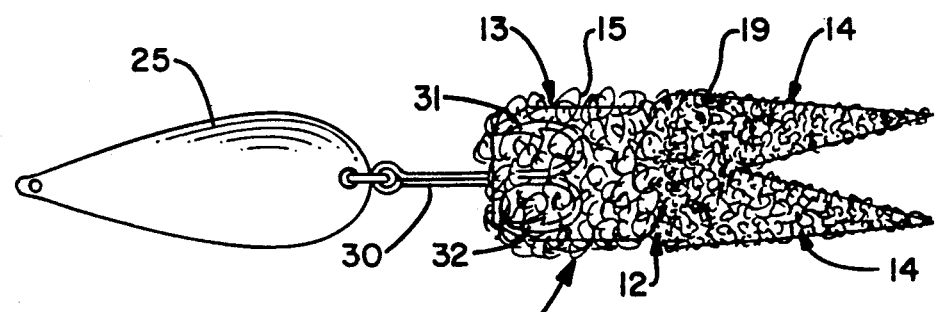
FIG. 5 is a top plan view similar to FIG. 3 illustrating the lure as it may be used in conjunction with a double pointed fish hook.
Figure 6:
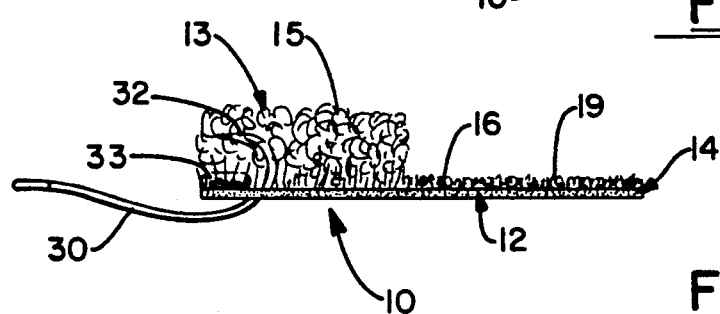
FIG. 6 is a side, elevational view of the fishing lure depicted in FIG. 5, but illustrating the addition of a sound generating device located within the fibers extending outwardly from the head portion of the lure.

Referring to FIGS. 3 and 4 of the drawings, the lure 10 is illustrated as it may be mounted in association with a spoon-type fishing lure 25. The spoon 25 carries a trailing hook 26, the point 28 of which penetrates the head portion 13 of the lure 10 so that all of the previously described advantages of the lure 10 may now be imparted to the conventional spoon 25. Many spoons 25 carry a double hook 30, as illustrated in FIGS. 5 and 6, and it can be appreciated that the head portion 13 may be of sufficient size to accept and encase both points 31 and 32 within the relatively long wool fibers 15. Of course, all of the aforementioned advantages of the improved lure 10 are present irrespective of whether the lure 10 is used with a single hook 11 or whether the lure 10 is employed as a trailer on another lure, such as a spoon 25.

Referring to FIG. 6 of the drawings, an additional advantage of the present invention is illustrated by the addition of a small sound generating device 33 which may affixed to surface 16 on the body 12 among the relatively long wool fibers 15 which extend outwardly from the head portion 13 of either lure 10 or 110. Sound generating devices are already known in the fishing art and generally these comprise a small vial, or enclosed tube, having one or more BBs which are allowed to move freely within the chamber formed by the enclosure. The BBs will generate noise when they are caused to move within the chamber by the action of the lure 10 or 110. Obviously, other configurations of sound generators may be used, and they may also be similarly located. By so locating the sound device 33, it will not detract from the dynamics which create the motion of the lure 10 which the fish find so tantalizing.

From the foregoing discussion it will be apparent that artificial fishing lures 10 or 110 embodying the concepts of the present invention offers many unique advantages and capabilities not found in the prior art. Either lure 10 or 110 may be fished using only a single hook 11 or 111, and, by the addition of various weights (not shown) located a short distance forward of the lure on the line 34, it may be easily cast, retrieved on the surface, retrieved below the surface, jigged, and/or trolled.

Furthermore, lure 10 may be used in combination with many of the presently available lures to act as a trailer in the manner of conventional pork rind. In such a combination the lure 10 may add considerable lifelike motion and an ability to carry larger quantities of fish attractant. In addition, either lure 10 or 110 may carry many configurations of a sound generator 33 on the head portion 13 or 113. It should also be appreciated that either lure may be downsized so as to be adapted for use with fly rods and still possess all of the aforementioned advantages. Many other ways of using and fishing the lure of the present invention will become apparent to those knowledgeable in this art, and the scope of the invention should not, therefore, be limited in any way by the manner in which the lure 10 is used.

Finally, it should be appreciated that natural sheepskin may be simulated by synthetics in various ways. While natural sheepskin is the preferred material, the invention should not be limited to natural sheepskin. All considered, the present invention fully accomplishes the several objects thereof.

I claim:

1. An artificial fishing lure in combination with a fish hook having an eye, a shank portion and a point, said fishing lure comprising:
   a body having a head portion with at least one surface and a leading edge;
   said body being natural sheepskin which presents at least one planar surface and also having a long, narrow portion extending rearwardly from said head portion;
   a plurality of relatively long fibers which are natural wool fibers presented from the planar surface of said sheepskin extending outwardly from at least one surface of said head portion;
   means to interconnect said head portion to the shank of the hook in proximity to the eye thereof;
   the point of the hook also penetrating said head portion to be received among said relative long fibers.

2. The combination, as set forth in claim 1, further comprising:
   a lateral offset incorporated in the shank of the hook;
   said head portion having a leading edge;
   an aperture penetrating said head portion in proximity to said leading edge; and,
   said lateral offset being received within said aperture to effect the interconnection between said head portion and said shank.

* * * * *